United States Patent [19]
Rivard

[11] Patent Number: 5,630,481
[45] Date of Patent: May 20, 1997

[54] RADIAL SLEEVE BEARING AND ASSOCIATED LUBRICATION SYSTEM

[75] Inventor: Robert L. Rivard, West Boylston, Mass.

[73] Assignee: Tuthill Corporation, Millbury, Mass.

[21] Appl. No.: 399,426

[22] Filed: Mar. 7, 1995

[51] Int. Cl.$^6$ .................................................. F01M 1/00
[52] U.S. Cl. ...................... 184/11.2; 184/13.1; 384/297; 384/908
[58] Field of Search .................... 184/6.11, 6.16, 184/11.2, 6.22, 13.1, 64, 11.5; 384/276, 297, 908, 913

[56] References Cited

U.S. PATENT DOCUMENTS

| | | | |
|---|---|---|---|
| 1,869,362 | 8/1932 | Ackerman | 184/11.5 |
| 3,476,452 | 11/1969 | Hagg et al. | 184/11.2 |
| 3,826,338 | 7/1974 | Mair | 184/11.2 |
| 4,366,993 | 1/1983 | Ono et al. | 384/276 |
| 4,597,679 | 7/1986 | Wlodkowski | 184/11.5 |
| 4,747,705 | 5/1988 | Agrawal | 384/118 |

FOREIGN PATENT DOCUMENTS

| 265017 | 2/1927 | United Kingdom | 184/11.2 |
|---|---|---|---|

OTHER PUBLICATIONS

*Design of Machine Elements* p. 368 dated Dec. 1977.

Primary Examiner—Thomas E. Denion
Attorney, Agent, or Firm—Samuels, Gauthier, Stevens & Reppert

[57] ABSTRACT

An improved sleeve bearing and associated lubrication system for the rotor shaft of a steam turbine. The bearing is lined with a metallic-polymeric composite, and is fixedly supported within a housing defining a reservoir containing a supply of liquid lubricant. The lubrication system includes a ring loosely surrounding the rotor shaft at a location spaced axially from the bearing. A lower portion of the ring is partially submerged in the lubricant. The ring is rotatably driven in response to rotation of the rotor shaft, with lubricant picked up on the ring being centrifugally discharged radially outwardly onto the surrounding housing walls. A system of communicating troughs, scuppers and passageways receives lubricant running off the housing walls for delivery under gravity to the bearing. Return passageways direct lubricant exiting from the bearing past water cooled chambers, over a weir and back to the reservoir.

9 Claims, 5 Drawing Sheets

RADIAL SLEEVE BEARING AND ASSOCIATED LUBRICATION SYSTEM

BACKGROUND OF THE INVENTION

1. Field of the Invention

This invention relates generally to single-stage mechanical-drive steam and gas-expansion turbines, and is concerned in particular with improvements in the bearings employed to rotatably support the rotor shafts of such turbines, as well as to improvements in the systems used to lubricate such bearings.

2. Description of the Prior Art

Historically, mechanical-drive turbines have been fitted either with antifriction bearings of the ball or roller type, or with hydrodynamically lubricated sliding metallic sleeve bearings. Antifriction bearings must be replaced periodically, with attendant interruptions in turbine operation. Because of such periodic service interruptions, the use of antifriction bearings is generally restricted to relatively low-powered, smaller turbines in non-critical service applications.

In contrast, if properly installed and lubricated, sleeve bearings have virtually unlimited life. Thus, sleeve bearings have been applied to all types of mechanical-drive turbines, including those with higher power ratings, and in particular those operating in critical service applications where process requirements cannot tolerate periodic outages to accommodate bearing maintenance.

Turbine sleeve bearings have conventionally comprised multiple metallic layers, with the innermost layer which bears against the rotor journal usually consisting of a babbitt material. The babbitt material is a relatively soft metal alloy of lead, tin, antimony or copper in various proportions. Because of their relative softness, babbitt materials are characterized by a property commonly referred to as "imbedability", i.e. an ability to absorb reasonable quantities and sizes of foreign contaminants such as metal particles and debris which become embedded in the babbitt material without resulting damage to the journal. The babbitt materials are also considered to have "conformability", which means that they tend to wear-in during initial service, thereby harmlessly accommodating minor imperfections and misalignments in the journals and bearings.

The conventional sleeve bearings are commonly lubricated hydrodynamically at low to moderate speeds by one or more oil rings which ride on the rotor journal through "windows" provided at the top of the bearing sleeve. The oil rings extend below the journal and sleeve and are partially submerged in a lubricant pool contained within the bearing housing. As the journal revolves, the oil ring also revolves as a result of its frictional contact with the journal surface, and in so doing the oil ring picks up lubricant by surface tension from the underlying pool. This oil is then deposited on the journal and is distributed by gravity and viscous effects into the sleeve bearing where it serves to support the rotating journal on a hydrodynamically created oil film.

Under ideal operating conditions, the conventional oil ring-type lubrication system operates in a generally satisfactory manner to provide adequate lubrication for the bearing. However, the higher operating pressures, temperatures, speeds and attendant structural deflections of contemporary turbines have sorely taxed the capabilities of conventional lubrication systems, often resulting in an insufficient delivery of lubricant to the bearing.

An inherent limitation in conventional sleeve bearing lubrication systems stems from the fact that oil ring rotary speed is not directly related to the rotational speed of the journal. More particularly, at increasing journal speeds, the oil ring increasingly exhibits a tendency to "slip" on the journal. It appears that such slippage results from the oil ring itself riding on an oil fill on the journal, rather than being directly driven by metal-to-metal traction between the ring and journal. This condition is further exacerbated by the increased force required to drag the oil ring through the underlying pool of oil. The net effect is that at increasing journal speeds, oil ring speeds gradually level off, and as a result the oil rings become incapable of continuing to supply enough oil to support proper lubrication and heat removal.

A further difficulty with the conventional oil ring arrangement is that oil must be delivered to the bearing from the inside diameter of the ring where it rides on the journal. However, at higher rotational speeds, oil is centrifuged out of the ring's inner surface and is thus cast off radially to the bearing housing walls rather than being delivered to the bearing where it is needed.

Insufficient bearing lubrication quickly translates into increased bearing temperatures. The conventional babbitt materials, because of their softness, are relatively weak and their strength diminishes progressively at increasing temperatures. When lubrication is marginal, or if the bearings are initially subjected to misalignment, they tend to rapidly overheat and fail. The first mode of this failure is commonly referred to as "wiping", a term that reflects the circumferential tearing and smearing of the distressed babbitt surface. If the source of distress is severe and not timely corrected, the deterioration may progress precipitously, with a resulting catastrophic failure of either or both the bearing and journal.

SUMMARY OF THE INVENTION

A general objective of the present invention is the provision of an improved turbine rotor bearing and associated lubrication system having the capability of operating reliably over extended periods of time at the increased pressures, temperatures and speeds of contemporary turbines.

A more specific objective of the present invention is to replace the babbitt materials employed as the innermost layers of conventional all metallic sleeve bearings with metallic-polymeric materials which although known for other applications, have heretofore not been considered for use as sleeve bearing materials for mechanical-drive steam and gas-expansion turbines.

A companion objective of the present invention is the relocation of the conventional oil rings to positions axially remote from the sleeve bearings, coupled with the efficient capture of oil being centrifuged from the rings for delivery by gravity to the bearings. By axially displacing the oil rings from the bearings, it becomes possible to shorten the bearings, thereby minimizing any adverse effects resulting from bearing misalignments.

A further objective of the present invention is the provision of improved cooling and removal of entrained air from the bearing lubricant, thereby avoiding harmful lubricant hot spots, thermal stratification and short-circuit redelivery of hot oil back to the bearings.

These and other objects and advantages of the present invention will be described in greater detail with reference to the accompanying drawings, wherein:

DETAILED DESCRIPTION OF PREFERRED ILLUSTRATED EMBODIMENT

Figure 1:
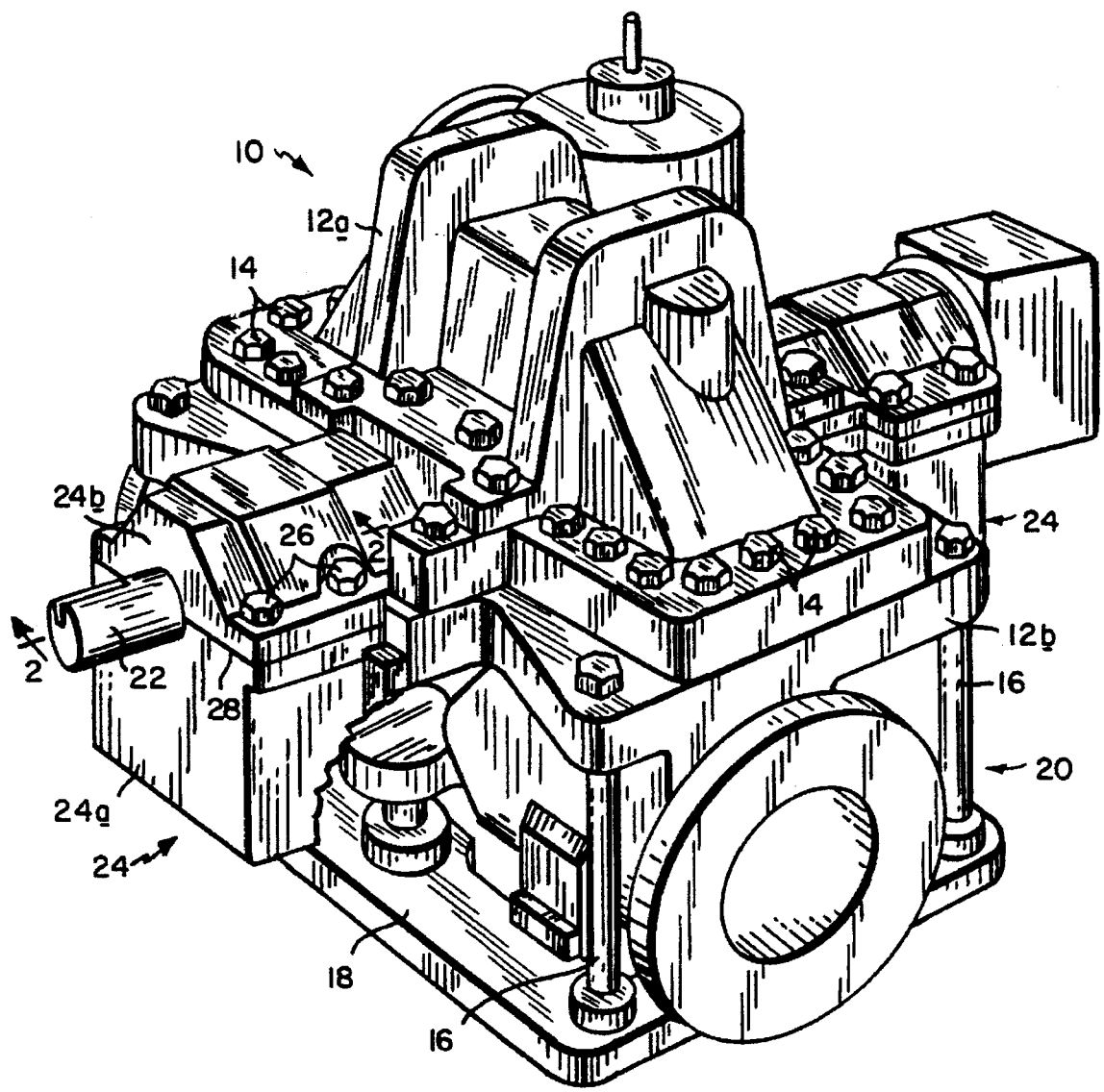
FIG. 1 is a perspective view of a single-stage mechanical-drive steam turbine having bearing housings containing sleeve bearings and bearing lubrication systems in accordance with the present invention.
Figure 2:
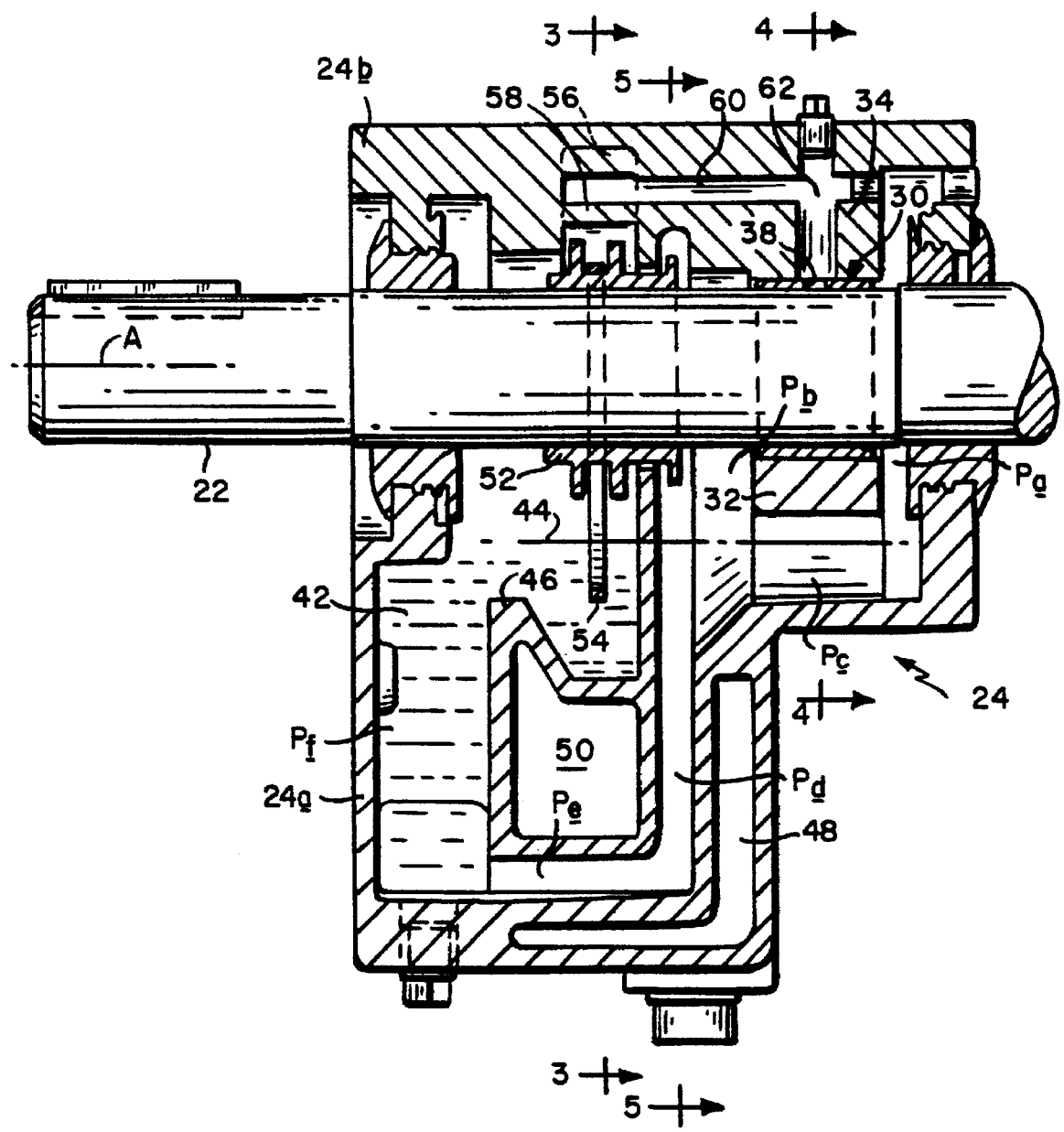
FIG. 2 is a sectional view on an enlarged scale taken through one of the bearing housings along line 2—2 of FIG. 1.

Referring initially to FIG. 1, a single-stage mechanical-drive steam turbine is generally indicated at 10. Turbine 10 includes a pressure casing comprising upper and lower sections 12a, joined together by bolts typically indicated at 14. The turbine is suspended on the upper ends of vertical support posts 16 extending upwardly from an underlying base frame 18. The support posts 16 and base frame 18 comprise parts of a support structure generally indicated at 20, which is described and claimed in a copending commonly owned patent application filed on Feb. 24, 1995, Ser. No. 08/393,728, the disclosure of which is herein incorporated by reference.

Turbine 10 includes a rotor shaft 22 driven by components (not shown) contained within the pressure casing. Shaft 22 is rotatably supported by bearings to be hereinafter described contained in essentially identical bearing housings 24.

Figure 7:
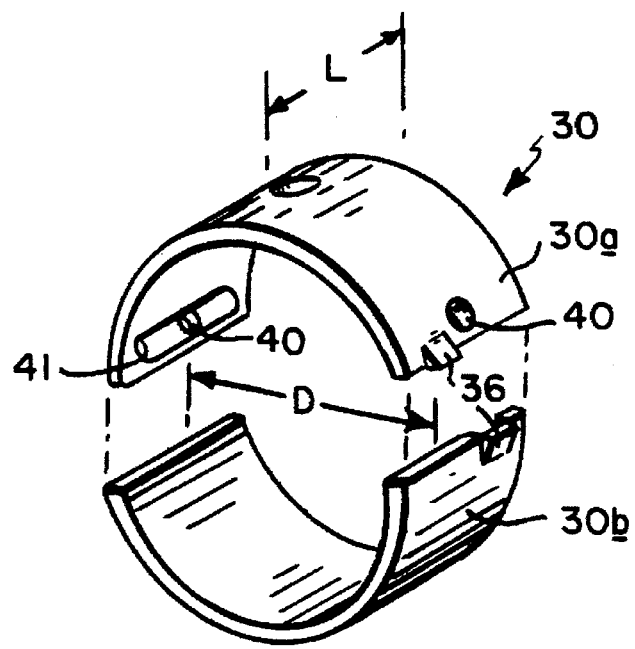
FIG. 7 is an exploded perspective view of a sleeve bearing.

Referring additionally to FIG. 2–6, it will be seen that each bearing housing 24 includes a base section 24a and a cap 24b joined one to the other by bolts 26 at a horizontal interface 28 containing the axis A of rotor shaft 22. The rotor shaft is journalled for rotation in a sleeve bearing 30 captured between internal integral webs 32, 34 of the base section 24a and cap 24b. As can best be seen in FIG. 7, the bearing 30 is subdivided into upper and lower halves 30a, 30b, each being provided with laterally projecting ears 36 arranged to mechanically interengage with the webs 32, 34 in preventing rotation of the bearing halves. The upper bearing half 32a is provided with a top oil port 38 and side oil ports 40 located above the horizontal centerline of the bearing. The oil ports communicate with internal distribution grooves, one of which is shown at 41 in FIG. 7.

The bearing halves 30a, 30b are lined with a metallic-polymeric materials of the type sold by Glacier Vandervell Ltd. of Middlesex, England under the trade marks "DU" and "Hi-eX". The DU material is a metal backed, PTFE (Polytetrafluoroethylene) and lead lined composite. Hi-eX is a steel backed composite bearing material lined with PEEK (polyether ether ketone) along with various fillers including PTFE. Such materials offer all of the advantages of conventional babbitt materials, while obviating or at least substantially minimizing any of their associated drawbacks and deficiencies. More particularly, the metallic-polymeric materials have equal or better imbedibility and conformability characteristics as well as self-lubricating properties which allow the bearings to run dry for indefinite periods. This provides undiminished performance, load capacity and reliability during high-rate turbine startups and during operation following lengthy periods of shutdown. These metallic-polymeric materials have extremely high continuous operating temperature limits ranging up to 536° F. and are therefore unaffected by hot shutdown extremes, well past the ignition point of the most common turbine lubricating oils and past the melting point of all babbitt bearing alloys. This also means that under high bearing misalignment conditions caused by high turbine operating pressure and high thermal deflections, the metallic-polymeric materials will survive transient abnormal bearing edge-loading conditions until the bearing re-beds itself. Such materials will therefore survive conditions under which a babbitt bearing would fail through wiping, seizure and localized melt-down, e.g. a catastrophic failure.

Such materials are unaffected by and thrive on straight water or water-oil emulsions, and are thus highly resistant to deterioration from contamination of lubricating oil by influx from broken or neglected and worn turbine steam and atmospheric seals.

Turning now to a description of the bearing lubrication system, the base section 24a of the bearing housing is internally configured to define an oil reservoir containing a supply of oil 42 at a level 44. As can best be seen in FIG. 2, the reservoir includes paths $P_a$, $P_b$ leading downwardly from opposite ends of the bearing 30 to a lower connecting path $P_c$ which in turn leads to a downward vertical path $P_d$ connecting with a lower horizontal path $P_e$. The horizontal path $P_e$ leads to a vertical path $P_f$ which extends upwardly to a weir 46. The paths $P_d$, $P_e$ and $P_f$ lead past chambers 48 and/or 50 through which cooling water is constantly circulated.

A drive collar 52 is tightly fitted on the rotor shaft 22 for rotation therewith. An oil ring 54 loosely surrounds the rotor shaft 22 and drive collar 52 at a location spaced axially from the bearing 30. The oil ring depends from the collar 52 and is partially submerged in the oil 42 contained in the underlying reservoir.

The bearing cap 24b has an upper recess 56 spanned by a trough 58 spaced above the oil ring 54 and leading to a horizontal passageway 60 in the internal web 34. Passageway 60 in turn communicates with a vertical passageway 62 leading to the top oil port 38 in the upper bearing half 30a.

Figure 3:
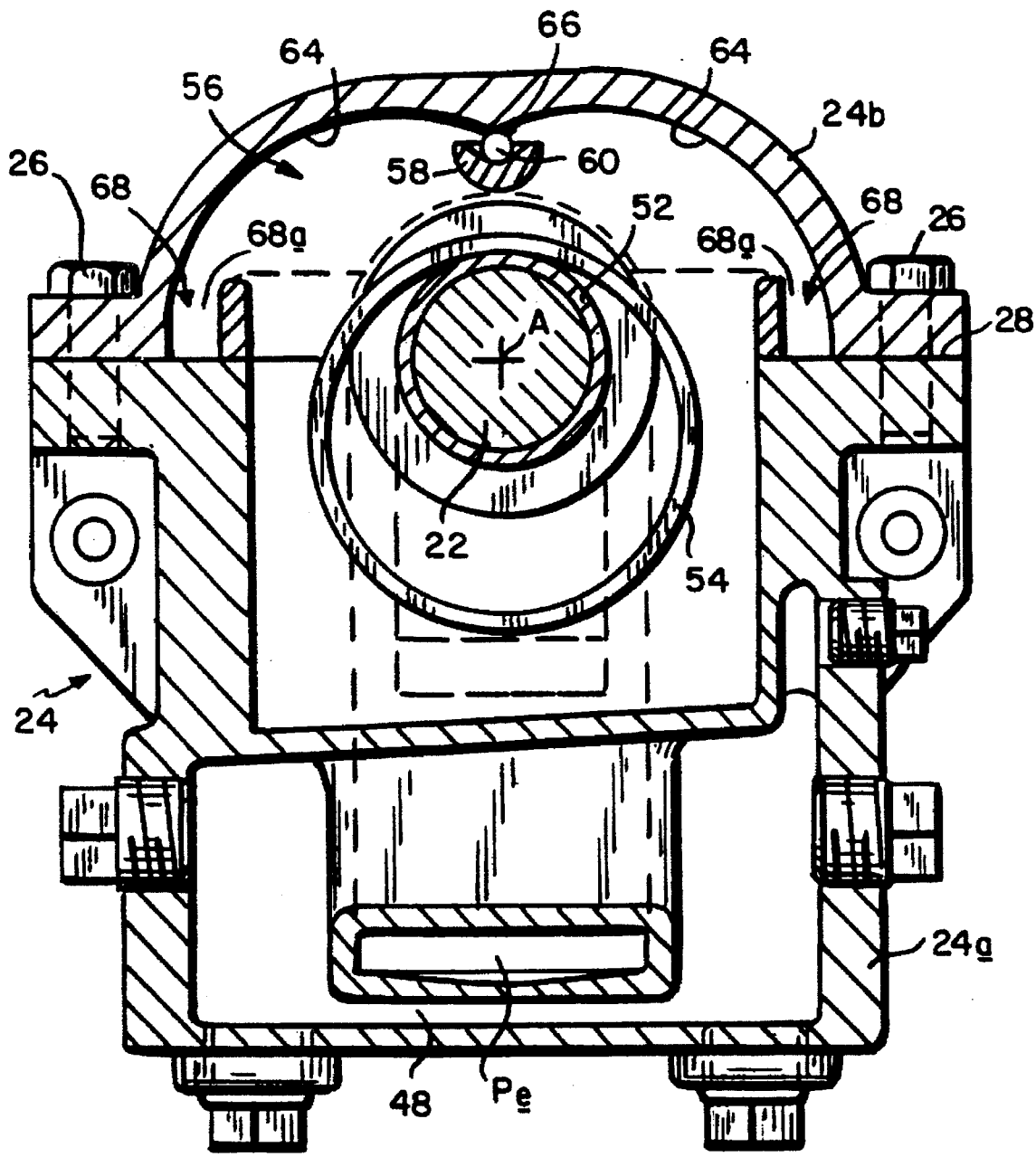
FIGS. 3, 4, and 5 are sectional views taken respectively along lines 3—3, 4—4 and 5—5 of FIG. 2.
Figure 4:
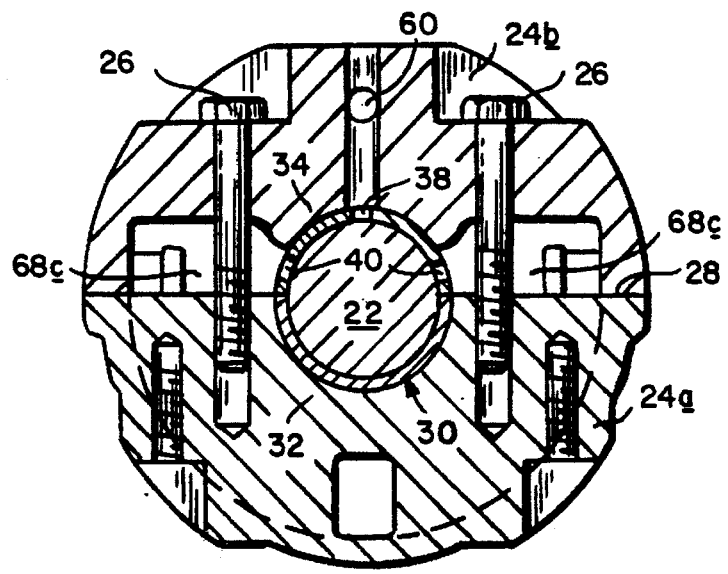
Figure 5:
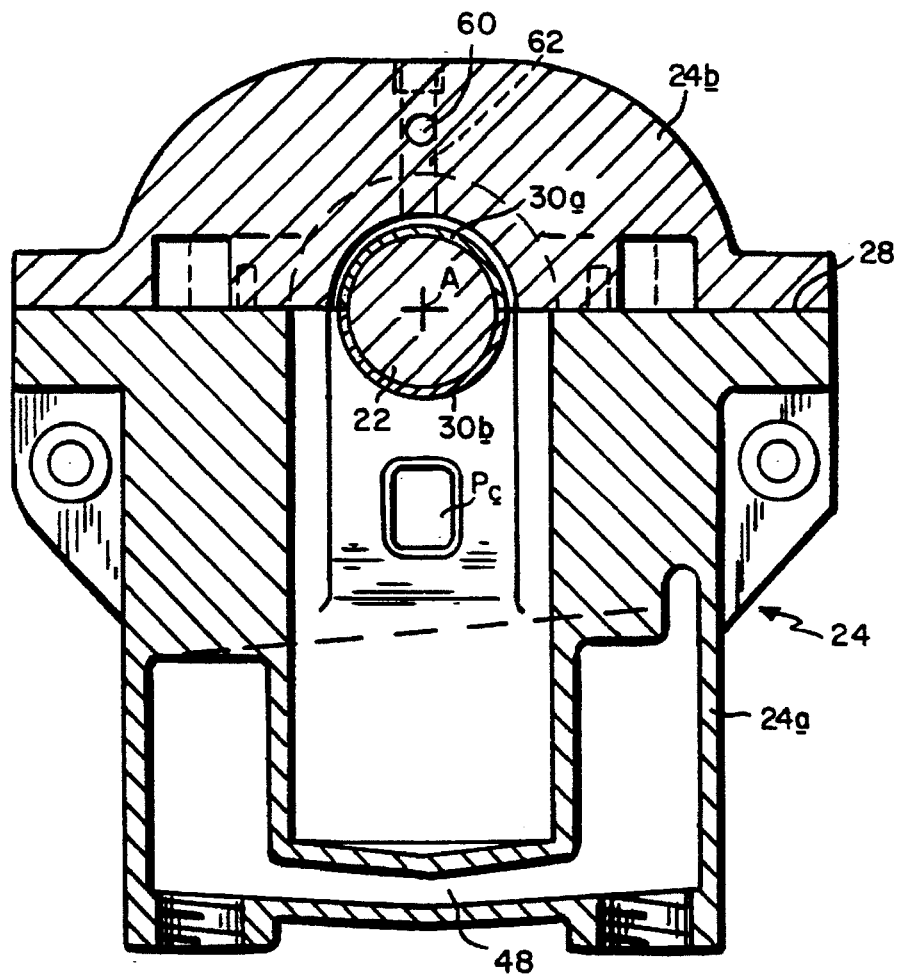
Figure 6:
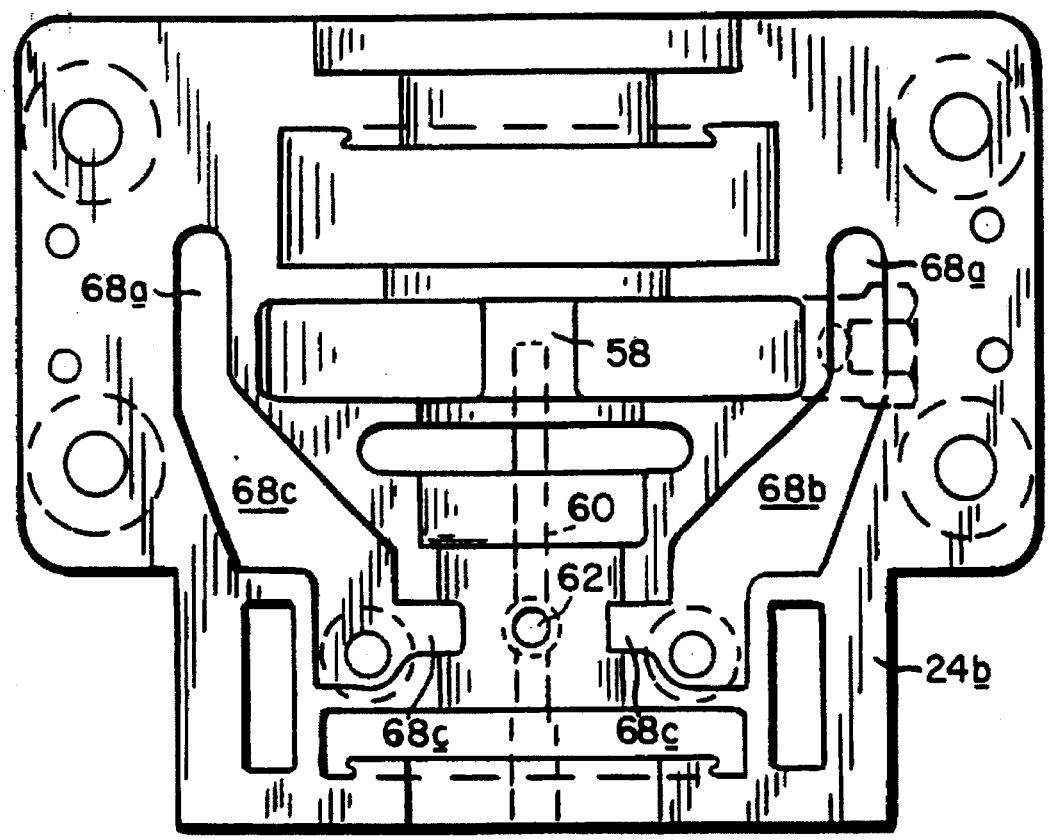
FIG. 6 is a bottom view of the bearing cap.

As is best shown in FIG. 3, the upper cap recess 56 has arcuate roof segments 64 with adjacent ends which meet as at 66 at a location spaced above the trough 58, and with opposite ends which lead to side scuppers 68. As can best be seen in FIG. 6, the side scuppers 68 have parallel segments 68a, diagonally inwardly converging segments 68b, and laterally inwardly extending segments 68c. As can best be seen in FIG. 4, the scupper segments 68c communicate with the oil side ports 40 in the upper bearing half 30a.

During turbine operation, the oil ring 54 is revolved by the drive collar 52 which is tightly fitted to the turbine rotor shaft 22. The oil ring is partially submerged in the turbine lubricating oil 42 which is maintained at oil level 44. Oil is picked up on the ring 54 by capillary attraction (surface-tension) and then shed from the ring under centrifugal force, spraying in all radial directions and resulting in oil impinging on the arcuate roof segments 64 of the bearing cap 24b. Oil runs down the roof segments 64 under gravity into the central trough 58 and into the side scuppers 68. The trough 58 and its communicating passageways 60, 62 are arranged to deliver a gravity flow of oil to the top oil port 38 of the bearing 30. Similarly, the side scuppers 68 are designed to deliver a gravity flow of oil to the side ports 40 of the bearing 30.

Lubricating oil enters the upper bearing half 30a through ports 38 and 40 where it serves to hydrodynamically support the rotating shaft 22 before exiting into the reservoir paths $P_a$, $P_b$. From here, the oil continues to flow under gravity along paths $P_c$, $P_d$ and $P_e$ before rising along path $P_f$ and passing over weir 46 to again arrive in the vicinity of the submerged portion of the oil ring 54. As the oil flows along paths $P_d$, $P_e$ and $P_f$, it is cooled by the coolant being circulated through chambers 48, 50. As the oil makes the turn from vertical to horizontal flow over the weir 46, any buoyant entrained air and foam will continue to ascend and will ultimately effervesce at the surface 44.

In light of the foregoing, those skilled in the art will appreciate that the present invention offers a number of significant advantages. For example, the lower bearing half 30b, which is the most heavily loaded portion of the bearing, is uninterrupted by oil ports and grooves, and thus offers full bearing area and capacity. This, when combined with the remote positioning of the oil ring 54 outside of the bearing confines, makes it possible to design the bearing with unique short proportions for enhanced tolerance to bearing and housing misalignment. Indeed, with this bearing design, the ratio of bearing length L to bearing diameter D can be expressed as:

$$L/D \leq 0.75$$

The axially remote positioning of the oil ring and its associated oil collection system, including the trough 58, arcuate roof segments 64 and side scuppers 68, takes advantage of the oil being centrifugally cast off the oil ring, and thereby provides a lubricating oil delivery system which increases delivery of oil to the bearing in direct proportion to increasing rotational speed of the turbine rotor shaft 22.

All hot oil exiting from the bearing 30 must return in a unidirectional path past the water cooled surfaces of chambers 48, 50, thereby eliminating any possibility of stratification, stagnation and the creation hot spots. All oil returning to the vicinity of the oil ring 54 must pass over the weir 46, thus providing for optimal deaeration. Thus, short circuiting of hot air laden oil from bearing 30 back to the vicinity of the oil ring 54 is eliminated, thereby maximizing cooling efficiency.

It will be understood that various changes and modifications may be made to the above described embodiment without departing from the spirit and scope of the invention as defined by the appended claims. For example, multiple oil rings may be employed in place of the single disclosed oil ring 54. The disclosed lubrication system may be advantageously employed with bearings lined with other materials, including the conventional babbitt materials.

I claim:

1. An oil ring lubrication system for a sleeve bearing rotatably supporting the rotor shaft of a steam turbine, said lubrication system comprising:

a bearing housing fixedly supporting said bearing and defining a reservoir containing a supply of liquid lubricant;

a ring loosely surrounding and rotatable relative to said shaft at a location spaced axially from said bearing, a lower portion of said ring being partially submerged in said lubricant, said ring being rotatably driven in response to rotation of said shaft, with lubricant picked up on said ring through capillary attraction being centrifugally discharged radially outwardly from said ring; and supply conduit means for receiving and delivering the centrifugally discharged lubricant to said bearing.

2. The lubrication system of claim 1 wherein said supply conduit means is adapted to accommodate gravity flow of lubricant to said bearing.

3. The lubrication system of claim 1 further comprising return conduit means for directing a return flow of all of the lubricant delivered to said bearing back to said reservoir at the vicinity of the partially submerged oil ring.

4. The lubrication system of claim 3 wherein said return conduit means is adapted to accommodate gravity flow of lubricant from said bearing to said reservoir.

5. The lubrication system of claim 1 wherein said bearing has a L/D ratio of $\leq$ to 0.75 where:

L=axial length of the bearing

D=internal diameter of the bearing.

6. The lubrication system of claims 1 or 5 wherein said bearing is lined with a metallic-polymeric composite.

7. The lubrication system of claim 3 wherein said bearing housing additionally includes coolant passageways for accommodating a circulating flow of a liquid coolant, said coolant passageways sharing common walls with said return conduit means and said reservoir.

8. The lubrication system of claims 3 or 7 wherein a portion of said return conduit means is adapted to direct lubricant upwardly prior to arriving at the vicinity of said oil ring.

9. The lubrication system of claim 8 wherein said return conduit means includes a weir over which the lubricant flows before arriving at the vicinity of said oil ring.

* * * * *